US009485161B2

(12) United States Patent
Chhabra et al.

(10) Patent No.: US 9,485,161 B2
(45) Date of Patent: Nov. 1, 2016

(54) SYSTEMS AND METHODS FOR SETTING UP END-TO-END TRAFFIC ENGINEERED ETHERNET LINE SERVICES

(71) Applicants: Mukesh Chhabra, New Delhi (IN); Rajneesh Mishra, Ghaziabad (IN); Prashant Vashisht, Gurgaon (IN); Tajeshwar Gill, Gurgaon (IN)

(72) Inventors: Mukesh Chhabra, New Delhi (IN); Rajneesh Mishra, Ghaziabad (IN); Prashant Vashisht, Gurgaon (IN); Tajeshwar Gill, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 168 days.

(21) Appl. No.: 14/496,006

(22) Filed: Sep. 25, 2014

(65) Prior Publication Data

US 2016/0050119 A1     Feb. 18, 2016

(30) Foreign Application Priority Data

Aug. 14, 2014  (IN) .......................... 2324/DEL/2014

(51) Int. Cl.
*H04L 12/28* (2006.01)
*H04L 12/26* (2006.01)
*H04L 12/913* (2013.01)
*H04L 12/24* (2006.01)

(52) U.S. Cl.
CPC .......... *H04L 43/0811* (2013.01); *H04L 43/10* (2013.01); *H04L 47/724* (2013.01); *H04L 41/0668* (2013.01); *H04L 41/0677* (2013.01); *H04L 41/0686* (2013.01); *H04L 41/0806* (2013.01); *H04L 41/5006* (2013.01)

(58) Field of Classification Search
CPC .......... H04L 41/0896; H04L 41/0668; H04L 41/0686; H04L 41/0816; H04L 41/12; H04L 41/5025; H04L 41/5038; H04L 43/0811
See application file for complete search history.

(56) References Cited

U.S. PATENT DOCUMENTS

| 8,306,039 | B2 | 11/2012 | Saksena et al. | |
| 8,526,313 | B1* | 9/2013 | Jones | H04L 43/0811 370/249 |
| 9,184,986 | B2* | 11/2015 | Mehta | H04L 41/0654 |
| 2012/0213093 | A1 | 8/2012 | Saltsidis | |
| 2012/0254376 | A1* | 10/2012 | Bumstead | H04L 49/351 709/220 |
| 2013/0114394 | A1 | 5/2013 | Hu et al. | |
| 2013/0128749 | A1* | 5/2013 | Krzanowski | H04L 41/0213 370/241.1 |
| 2013/0329565 | A1 | 12/2013 | Holness et al. | |
| 2014/0071825 | A1 | 3/2014 | Chhabra et al. | |
| 2014/0247829 | A1 | 9/2014 | Gautam et al. | |

OTHER PUBLICATIONS

Mohan, Dinesh, "802.1ag—Connectivity Fault Management Tutorial—Part 1," Nortel Networks, Jul. 12, 2004, slides 1-22.
"Service OAM Requirements & Framework—Phase 1," Metro Ethernet Forum, Apr. 2007.
"OAM functions and mechanisms for Ethernet based networks," Telecommunication Standardization Sector of ITU, Nov. 2013, pp. 1-99.

* cited by examiner

*Primary Examiner* — Curtis A Alia
(74) *Attorney, Agent, or Firm* — Clements Bernard PLLC; Christopher L. Bernard; Lawrence A. Baratta, Jr.

(57) ABSTRACT

A method, a switch, and a network includes receiving a request for an Ethernet service at a Maintenance End Point (MEP) in a network, wherein the Ethernet service has a destination of a Remote MEP (RMEP), and wherein the request includes bandwidth amounts for the request; utilizing Link Trace messaging to the RMEP to detect an active path to the RMEP; and utilizing Loop Back messaging to the RMEP to reserve bandwidth based on the bandwidth amounts on the active path.

18 Claims, 8 Drawing Sheets

SYSTEMS AND METHODS FOR SETTING UP END-TO-END TRAFFIC ENGINEERED ETHERNET LINE SERVICES

CROSS-REFERENCE TO RELATED APPLICATION(S)

The present patent application/patent claims the benefit of priority of Indian Patent Application No. 2324/DEL/2014, filed on 14 Aug. 2014, and entitled "SYSTEMS AND METHODS FOR SETTING UP END-TO-END TRAFFIC ENGINEERED ETHERNET LINE SERVICES," the contents of which are incorporated in full by reference herein.

FIELD OF THE DISCLOSURE

The present disclosure relates generally to networking systems and methods. More particularly, the present disclosure relates to systems and methods for setting up end-to-end traffic engineered (TE) Ethernet Line (E-Line) Layer 2 services.

BACKGROUND OF THE DISCLOSURE

Carrier Ethernet is evolving to support the needs of the carrier network environment. Carrier Ethernet requires scalable, reliable, and dynamic mechanisms to support operations, administration, and management (OAM) and traffic engineering (TE). Standards have been developed in the Metro Ethernet Forum (MEF), International Telecommunication Union (ITU), Institute of Electrical and Electronics Engineers (IEEE), and the like providing many of these required extensions. Specifically, Connectivity Fault Management (CFM) is an Ethernet standard to provide many common OAM functions associated with underlying network transport for services. For example, CFM is defined in IEEE 802.1ag-2007 IEEE Standard for Local and Metropolitan Area Networks Virtual Bridged Local Area Networks Amendment 5: Connectivity Fault Management, the contents of which are herein incorporated by reference. Also, OAM functions are also defined in ITU-T G.8013/Y.1731 (07/2011) "OAM functions and mechanisms for Ethernet based networks," the contents of which are herein incorporated by reference. Further, the MEF also defines Ethernet OAM in various technical specifications, such as MEF 17 (04/2007) "Service OAM Requirements & Framework," the contents of which are herein incorporated by reference. Variously, CFM enables definition of maintenance domains, their constituent maintenance points, and the managed objects required to create and administer them; definition of relationships between maintenance domains and the services offered by Virtual Local Area Network (VLAN)-aware bridges and provider bridges; description of protocols and procedures used by maintenance points to maintain and diagnose connectivity faults within a maintenance domain; and the like.

Conventionally, there is no standard way to reserve service bandwidth across a Layer 2 (L2) network when bandwidth is provisioned on user-network interface (UNI) or an External Network-Network Interface (E-NNI) ports other than to manually configure bandwidth on all intermediate nodes (with associated network-network interface (NNI) ports). Note, such an implementation exists in Internet Protocol (IP)/Multiprotocol label switching (MPLS)-based networks using Resource Reservation Protocol (RSVP)/RSVP-Traffic Engineering (RSVP-TE)/Constraint-based Routing Label Distribution Protocol (CR-LDP). RSVP reserves bandwidth for services across IP networks, and RSVP-TE extends this solution to MPLS LSPs (Label Switched Paths). This results in better predictability of traffic getting passed through the IP/MPLS network. This is a serious shortcoming of conventional L2 networks when E-Line services are provisioned with certain bandwidth guarantee parameters that no standard mechanism is available to test and configure these parameters across an end-to-end path of the service. E-Line services are point-to-point Ethernet Virtual Connections (EVCs) between two UNIs. The E-Line services can provide symmetrical bandwidth for data in either direction with a Committed Information Rate (CIR) and associated Committed Burst Size (CBS), Excess Information Rate (EIR) and associated Excess Burst Size (EBS), delay, jitter, and loss between the UNIs. The E-Line services can provide connections analogous to Time Division Multiplexed (TDM) private line services. The Traffic Engineered parameters of E-Line services only get provisioned on UNI ports of the network. This may result in over-subscription in network and becomes cumbersome for network administrators to add new services with desired service bandwidth on the network.

To overcome this limitation, network administrators can provision the desired bandwidth manually on the entire E-Line service network path, including intermediate network-network interface (NNI) ports. However, this process is time consuming and requires network administrators to login into all downstream nodes to reserve the bandwidth parameters. Additionally, manual allocation has challenges in guaranteeing L2 service behavior in cases where the run-time topology changes. If the network administrator chooses to reserve bandwidth for L2 service on backup path, this would be waste bandwidth which could be allocated to some other L2 service. If the network administrator does not reserve bandwidth on the backup path, service behavior cannot be guaranteed after switchover to the backup path. Also, if in the future, the network administrator wants to readjust bandwidth parameters, they will be required to login again into all participating nodes and reconfigure the network. This whole process is time consuming, which leads to slower turn up time for operators and results in revenue loss to the operator.

BRIEF SUMMARY OF THE DISCLOSURE

In an exemplary embodiment, a method includes receiving a request for an Ethernet service at a Maintenance End Point (MEP) in a network, wherein the Ethernet service has a destination of a Remote MEP (RMEP), and wherein the request comprises a requested bandwidth amount; utilizing Link Trace messaging to detect an active path to the RMEP; and utilizing Loop Back messaging to reserve the requested bandwidth amount on the active path. The utilizing Link Trace messaging can include transmitting Link Trace Messages (LTM) from the MEP to the RMEP and Maintenance Intermediate Points (MIPs) in-between; and receiving Link Trace Reply (LTR) messages from the RMEP and the MIPs. The utilizing Loop Back messaging can include transmitting Loop Back Message (LBM) messages from the MEP to the RMEP and Maintenance Intermediate Points (MIPs) in-between; and receiving Loop Back Reply (LBR) messages from the RMEP and the MIPs. The LBM messages can include an organization-specific Type-Length-Value (TLV) field with the requested bandwidth amount to allocate, and the LBR messages include an organization-specific TLV field with a status of the requested bandwidth amount at the RMEP and the MIPs. The requested bandwidth amount can include any one or more of Committed Information Rate (CIR), Committed Burst Size (CBS), Excess Information Rate (EIR), and Excess Burst Size (EBS). The MEP and the RMEP c at User-Network Interface (UNI) ports and the MIPs are at Network-Network Interface (NNI) ports.

The method can further include maintaining a list of a plurality of Ethernet services provisioned using the receiving and utilizing steps; releasing reserved resources for the plurality of Ethernet services, responsive to a topology change in the network; and repeating, based on an order, the receiving and utilizing steps for the plurality of Ethernet services. The order can be based on an order of provisioning of the plurality of Ethernet services or on a user specified priority. The method can further include receiving Loop Back Reply (LBR) messages from the RMEP and the MIPs indicating one or more failures or a Loop Back timeout; raising an alarm based on the one or more failures and/or indicating available bandwidth; and transmitting Loop Back Message (LBM) messages to de-allocate the requested bandwidth amount on any of the RMEP and the MIPs which replied back with success. The method can further include implementing a retry of the receiving and utilizing steps after a random amount of time.

In another exemplary embodiment, a switch includes a plurality of ports configured to switch Ethernet packets therebetween, wherein the plurality of ports include a User-Network Interface (UNI) port and a Network-Network Interface (NNI) port; a Maintenance End Point (MEP) configured at the UNI port; and a Maintenance Intermediate Point (MIP) configured at the NNI port; wherein, responsive to a request for an Ethernet service, the MEP performs a bandwidth reservation process which utilizes Link Trace messaging to a Remote MEP (RMEP) to detect an active path to the RMEP and, subsequent to the Link Trace messaging, utilizes Loop Back messaging to the RMEP to reserve bandwidth based on bandwidth amounts in the request on the active path. The Link Trace messaging to the RMEP can include transmitting Link Trace Messages (LTM) from the MEP to the RMEP and any MIPs in-between; and receiving Link Trace Reply (LTR) messages from the RMEP and the MIPs. The Loop Back messaging to the RMEP and the MIPs can include transmitting Loop Back Message (LBM) messages from the MEP to the RMEP and Maintenance Intermediate Points (MIPs) in-between; and receiving Loop Back Reply (LBR) messages from the RMEP and the MIPs.

The LBM messages can include an organization-specific Type-Length-Value (TLV) field with the bandwidth amounts to allocate, and the LBR messages include an organization-specific TLV field with a status of allocation of the bandwidth amounts at the RMEP and the MIPs. The bandwidth amounts can include any one or more of Committed Information Rate (CIR), Committed Burst Size (CBS), Excess Information Rate (EIR), and Excess Burst Size (EBS). The switch can further include a controller communicatively coupled to the plurality of ports, wherein the controller is configured to: maintain a list of a plurality of Ethernet services provisioned using the bandwidth reservation process; cause release of reserved resources for the plurality of Ethernet services responsive to a topology change in the network; and perform the bandwidth reservation process for the plurality of Ethernet services subsequent to the topology change based on an order. The order can be based an order of provisioning of the plurality of Ethernet services or on user specified priority.

In yet another exemplary embodiment, a network includes a plurality of interconnected switches; a Maintenance End Point (MEP) at a User-Network Interface (UNI) or an External Network-Network Interface (E-NNI) port on a first switch of the plurality of interconnected switches; a Remote MEP (RMEP) at a UNI port on a second switch of the plurality of interconnected switches; and a plurality of Maintenance Intermediate Points (MIP) at Network-Network Interface (NNI) ports on the plurality of interconnected switches; wherein a bandwidth reservation process is configured to reserve bandwidth at the UNI port on the MEP responsive to a request and configured to utilize Connectivity Fault Messaging (CFM) to detect an active path to the RMEP and to reserve bandwidth at the RMEP and any associated MIPs. The bandwidth reservation process can utilize Link Trace messaging to detect the active path, and the Link Trace messaging can include transmitting Link Trace Messages (LTM) from the MEP to the RMEP and any MIPs in-between; and receiving Link Trace Reply (LTR) messages from the RMEP and the MIPs. The bandwidth reservation process can utilize Loop Back messaging to reserve the bandwidth, and the Loop Back messaging can include transmitting Loop Back Message (LBM) messages from the MEP to the RMEP and Maintenance Intermediate Points (MIPs) in-between; and receiving Loop Back Reply (LBR) messages from the RMEP and the MIPs.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods setting up end-to-end traffic engineered (TE) Ethernet Line (E-Line) Layer 2 services are described. The systems and methods propose using IEEE 802.1ag CFM messaging and protocols (such as Link Trace and Loop Back) to set up L2 traffic engineered path for E-Line services. Using the systems and methods, a network administrator can provision traffic engineering parameters on UNI termination and an end-to-end path for a newly provisioned service is tested against Service Layer Agreement (SLA) parameters. If the requested bandwidth is available, it shall be reserved on the downstream NNI ports across an L2 network and an originating node shall receive a success response. If the required bandwidth is not available in an active path, the originating node receives a failure response with maximum available bandwidth in the active path. In this case, the originating node can also raise the alarm "Resource allocation failed" against the service in question and start a process of de-allocating resources on nodes which had previously reserved resources.

With L2 topology changes, the systems and methods release reserved resources and rerun the algorithm to compute bandwidth availability and reserve bandwidth for all L2 services managed by this algorithm. The order of resource reservation for provisioned services can be implementation specific (e.g. they can be reserved either in order of provisioning or user specified service priority). The systems and methods can be applied to existing as well as newly provisioned E-Line L2 services. The systems and methods relieve network planners/administrators from manually computing whether network bandwidth has been fully utilized or not. This manual computing is time consuming and often error prone. The systems and methods add significant value in guaranteeing committed bandwidth to higher priority L2 services especially after run-time L2 topology changes. Since the provisioning of the bandwidth on UNI ports is done on a basis of available bandwidth in the network, it avoids the congestion in the network due to over utilization in the network and results in better service predictability through the L2 network. The systems and methods bring intelligence in the way end-to-end bandwidth reservation is made for E-Line services across the L2 network. The systems and methods eliminate a possibility of network bandwidth wastage by reserving bandwidth only on active paths. Additionally, this solution dynamically adjusts to run-time topology changes to ensure that high priority E-Line services continue to get required bandwidth after failover. The systems and methods reduce the need for manual intervention as users do not provision bandwidth on each intermediate node.

Figure 1:
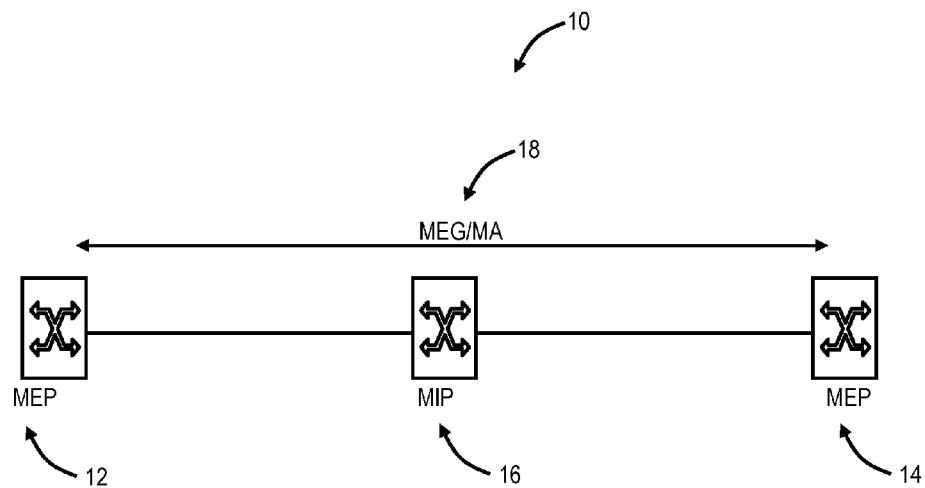
FIG. 1 is a network diagram of an exemplary Ethernet network configured with Carrier Ethernet OAM mechanisms.

Referring to FIG. 1, in an exemplary embodiment, a network diagram illustrates an exemplary Ethernet network 10 configured with Carrier Ethernet OAM mechanisms. For illustration purposes, the Carrier Ethernet network 10 includes three interconnected network elements 12, 14, 16. The network 10 includes Carrier Ethernet OAM mechanisms such as IEEE 802.1ag CFM, Y.1731, etc. Fundamental to CFM is the concept of a Maintenance Entity Group (MEG) or a Maintenance Association (MA), which is the identified network transport construct spanning the various network nodes underlying a given service or set of services. CFM relies on well-defined messages exchanged between the network elements, specifically and in particular each End Point (MEP) that provides origination and termination of the service transport path(s) for a MEG. The network elements 12, 14 are defined as a MEG End Point (MEP). In CFM, a MEP is configured to source and sink CFM frames, i.e. source and sink within a single configured MD (Maintenance Domain), pass-thru if MD Level is higher than the configured level for the MEP, and discard if MD Level is lower. The MEPs 12, 14 are also configured to participate in performance monitoring such as through CCMs. In a point-to-point network, there are two MEP nodes at the endpoints, and in other configurations, there may be multiple MEP nodes. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 16 is defined as a MIP which resides between MEPs, i.e. the MIP 16 is communicatively coupled between the MEPs 12, 14. A MIP is configured to process and forward CFM frames, but does not initiate CFM frames. The systems and methods contemplate implementation and operation of Carrier Ethernet networks such as those compliant to IEEE 802.1ag-2007, G.8013/Y.1731, and/or MEF. Of note, IEEE 802.1ag-2007 and G.8013/Y.1731 both relate to and define CFM for Ethernet OAM. The various terminology utilized herein, such as MEP, MIP, CCM, Protocol Data Unit (PDU), etc. is common to each of IEEE 802.1ag-2007, G.8013/Y.1731, MEF, etc. IEEE 802.1ag-2007 utilizes the term Maintenance Association (MA) whereas G.8013/Y.1731 utilizes Maintenance Entity Group (MEG) for the same construct. Those of ordinary skill in the art will recognize while described herein as the MA 18, the MA 18 could also be referred to as the MEG 18. Generally, the MA 18 and MEG relate to an administrative grouping relative to the MEPs 12, 14. Additionally, IEEE 802.1ag-2007 defines an MEP as a Maintenance association End Point whereas G.8013/Y.1731 and MEF define an MEP as a Maintenance Entity Group End Point. In the following description, MEP may be generally referred to as a Maintenance End Point covering both the constructs of IEEE 802.1ag-2007, G.8013/Y.1731, MEF.

The network elements 12, 14, 16 are configured in an MA 18 which enable a grouping of nodes in a maintenance group for OAM to be grouped on different spans. The MA 18 is a set of MEPs, each configured with a same unique MEG ID code (UMC) and MEG Level or Maintenance Association Identifier (MAID) and Maintenance Domain (MD) level. The MA 18 may be thought of as a full mesh a Maintenance Entities (MEs), the MEs including MEPs, MIPs, etc., with a set of MEPs configured therebetween. The UMC is a unique identifier for the MA 18 domain. Additionally, the MA 18 allows for nesting of various groups. The MEG Level and the MD are a management space on a network, typically owned and operated by a single entity. MEG Levels and MDs may be configured with names and levels, where the eight levels range from 0 to 7. A hierarchal relationship exists between domains based on levels. The larger the domain, the higher the level value. In case MEGs are nested, the OAM flow of each MEG has to be clearly identifiable and separable from the OAM flows of the other MEGs. In cases the OAM flows are not distinguishable by the ETH layer encapsulation itself, the MEG Level in the OAM frame distinguishes between the OAM flows of nested MEGs. Eight MEG Levels are available to accommodate different network deployment scenarios. As described herein, the various systems and methods may be applied to per-node MEPs, per-interface MEPs, or per-port MEPs. Specifically, a per-node MEP applies to an entire network element, whereas per-interface and per-port MEPs are for a single provisioned service on the network element.

Figure 2:
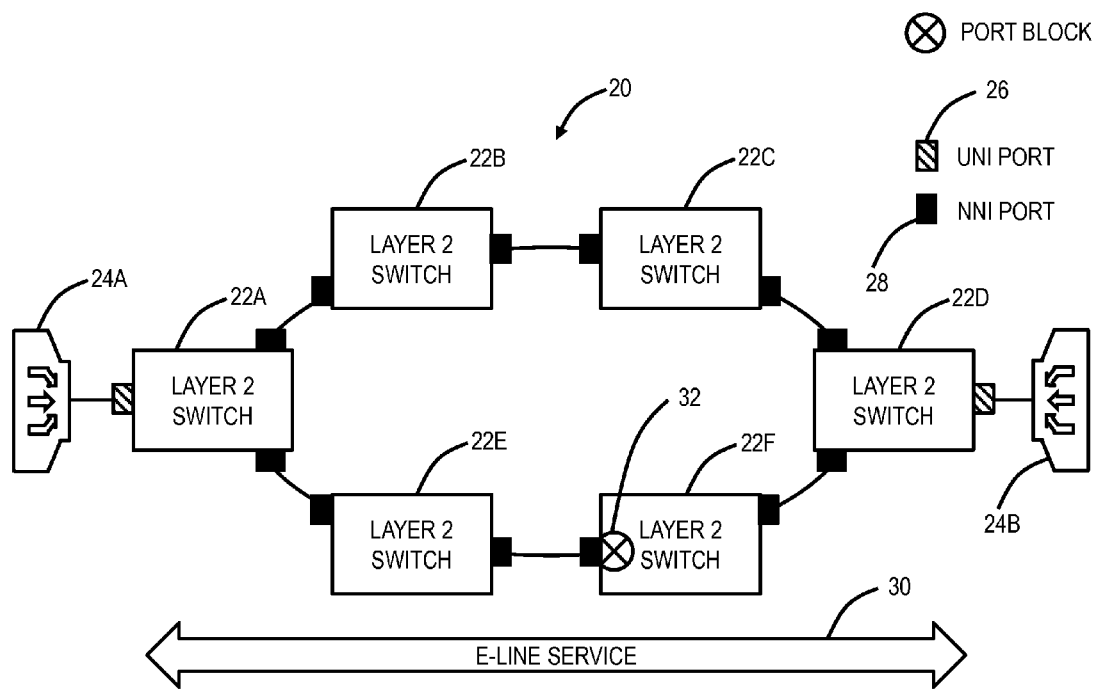
FIG. 2 is a network diagram of a network with various L2 switches interconnecting two Customer Premises Equipment (CPE) devices.

Referring to FIG. 2, in an exemplary embodiment, a network diagram illustrates a network 20 with various L2 switches 22 (depicted as switches 22A-22F) interconnecting two Customer Premises Equipment (CPE) devices 24 (depicted as CPE devices 24A-24B). The network 20 is utilized in various subsequent FIGS. herein to describe the systems and methods. Of course, the systems and methods contemplate operation in other L2 networks with the network 20 presented for illustration purposes. The network 20 includes various UNI ports 26 and NNI ports 28 interconnecting the CPEs 24A, 24B to form an E-Line service 30. In an exemplary embodiment, the E-Line service 30 includes an active path through the switches 22A, 22B, 22C, 22D, and a backup path through the switches 22A, 22E, 22F, 22D with a block 32 at an NNI port 28 on the switch 22F.

While setting up the E-Line service 30, different SLA parameters are ascertained between customer and service provider. Among various SLA parameters; CIR (Committed Information rate), EIR (Excess Information rate), CBS (Committed Burst Size) and EBS (Excess Burst Size) are the ones which define how much network bandwidth is required by the E-Line service 30. In current L2 networks, these parameters are provisioned by network administrators only on L2 nodes on which service access is done, i.e. the UNI ports 26 on the switches 22A, 22D. However, this does not guarantee that required bandwidth will be available to the customer across the downstream L2 network 20. There is another challenge L2 network administrator or network planners face in determining how many services they can safely add into the network and how much bandwidth shall be available for these services because they do not exactly know how much network bandwidth is already getting utilized for existing services and what are the SLAs. In order to solve this problem, sometimes administrator may choose to manually reserve bandwidth across the network 20. But this solution too has its shortcomings, especially in guaranteeing service bandwidth in topology change scenarios (e.g., modification of the block 32, etc.). If the bandwidth reservation is done on backup path also, this is waste of network bandwidth that could be allocated to some other service. If no reservation is done on backup path, service bandwidth requirements cannot be guaranteed after failover to backup path.

Figure 3:
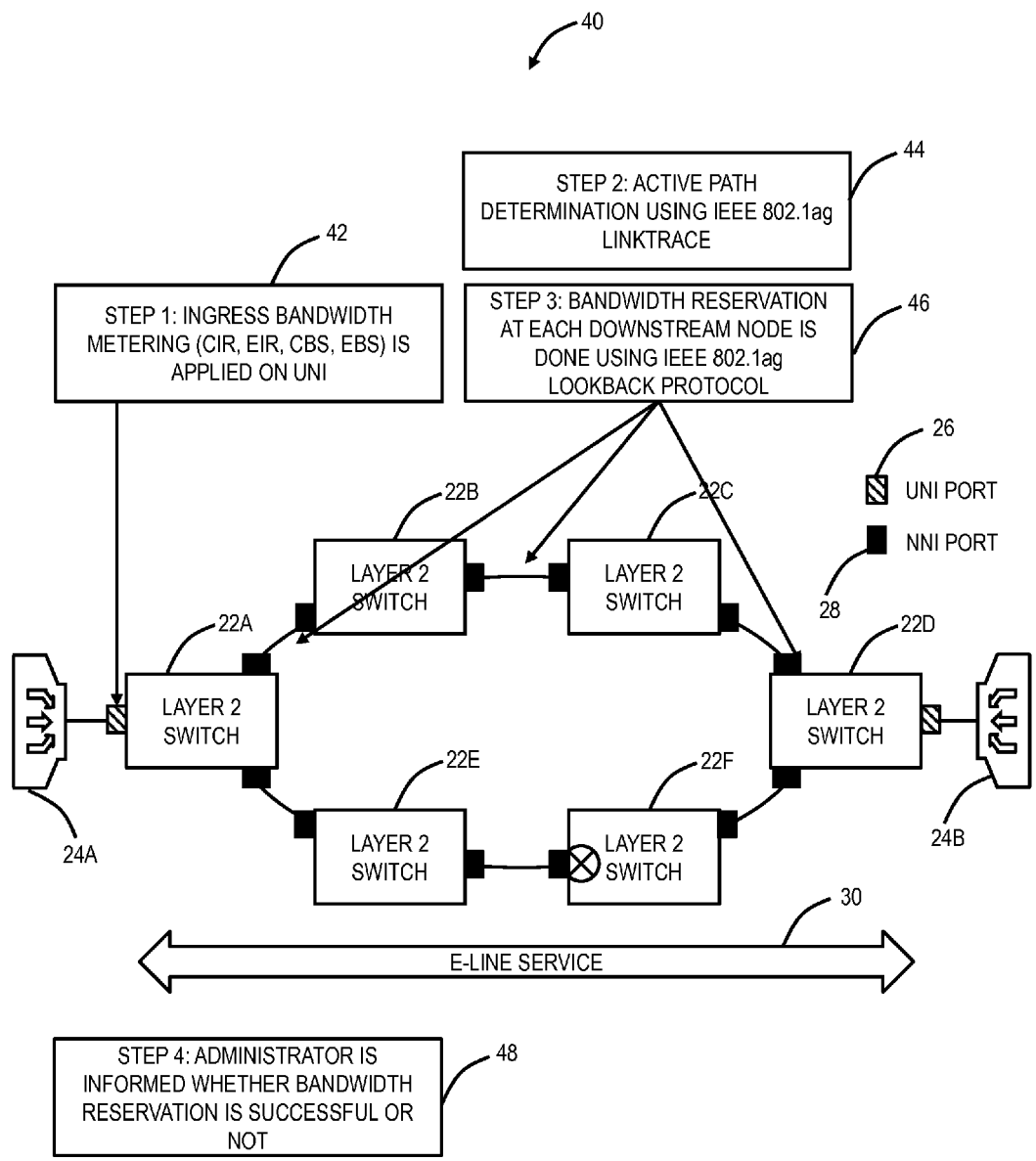
FIG. 3 is a network diagram of the network of FIG. 2 illustrating a process for setting up an end-to-end TE E-Line service.

Referring to FIG. 3, in an exemplary embodiment, a network diagram illustrates the network 20 illustrating a process 40 for setting up an end-to-end TE E-Line service. The process 40 uses IEEE CFM 802.1ag Link Trace and Loop Back protocols to set-up L2 traffic engineered path for E-Line services. Using the process 40, a network administrator can provision traffic engineering parameters on the UNI ports 26—ingress bandwidth metering (CIR, EIR, CBS, EBS) is applied on UNI ports (step 42), and an end-to-end path for this newly provisioned service is tested using an active path determination using IEEE 802.1ag Link Trace (step 44). If the requested bandwidth is available, it is reserved on the downstream NNI ports 28 across L2 network, e.g. bandwidth reservation at each downstream node is done using IEEE 802.1ag Look Back (step 46), and the originating node shall receive a success response or a failure response (step 48). If required bandwidth is not available in active path, the originating node shall receive failure response and the maximum available bandwidth in active path. In this case, the originating node can also raise the alarm "Resource allocation failed" against the service in question and start a process of de-allocating resources on nodes which had previously reserved resources.

Figure 4:
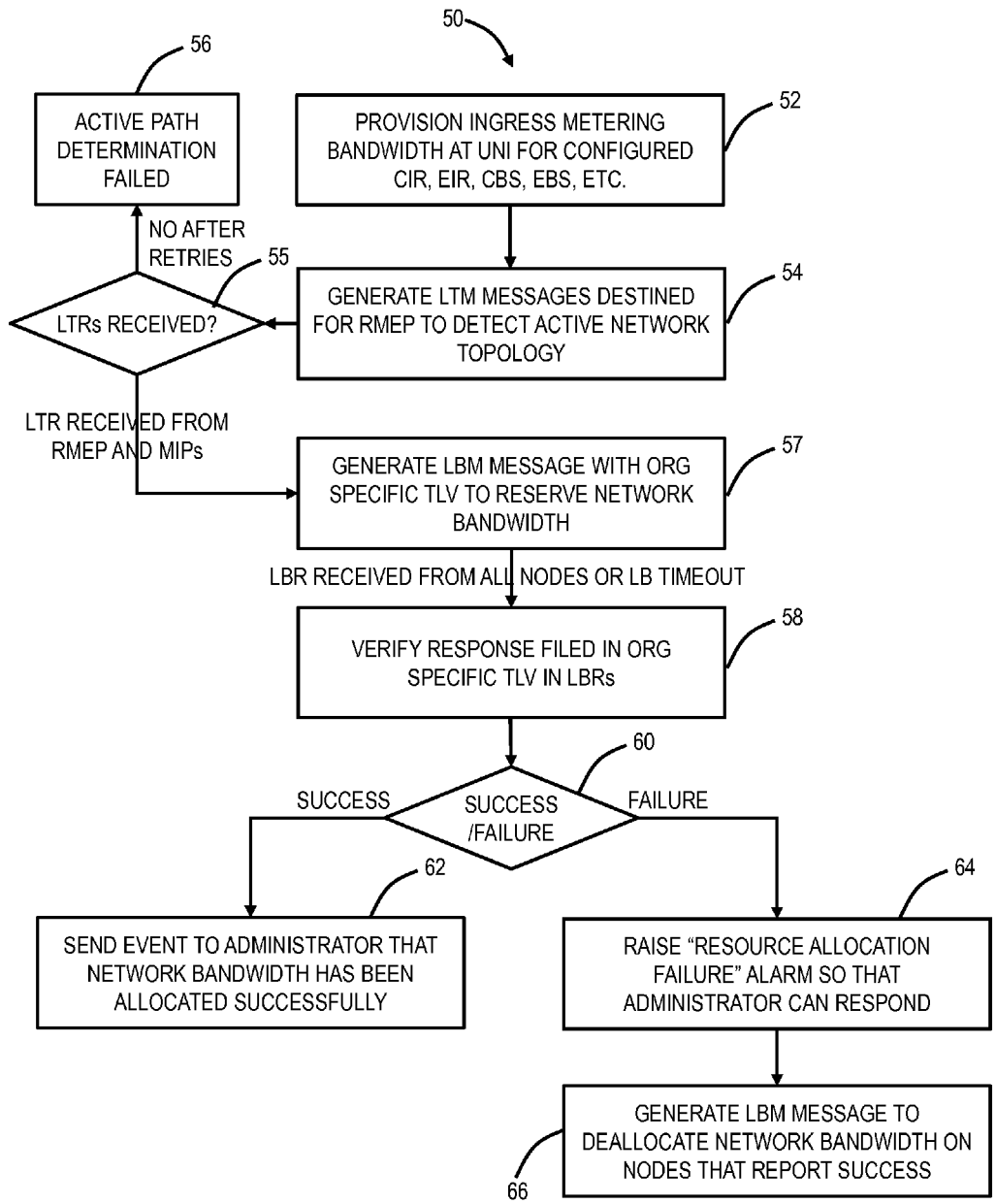
FIG. 4 is a flowchart of a bandwidth reservation process for E-Line services.

Referring to FIG. 4, in an exemplary embodiment, a flow chart illustrates a bandwidth reservation process 50 for E-Line services. The bandwidth reservation process 50 can be implemented in the network 20 across the switches 22 as well as with a management system. The bandwidth reservation process 50 includes provisioning ingress metering bandwidth for configured CIR, EIR, CBS, EBS, etc., at the UNI port (step 52). The bandwidth reservation process 50 includes generating a Link Trace Message (LTM) destined for a Remote MEP (RMEP) to detect active network topology (step 54), and waits for a Link Trace Reply (LTR) from the RMEP and MIPs (step 55). If the LTRs are not received, there can be a couple retries for the active path determination, and if the retries are unsuccessful, there is an active path determination failure (step 56) On receiving the LTR, the bandwidth reservation process 50 includes generating a Loop Back Message with organization (ORG) specific Type-Length-Values (TLVs) to reserve bandwidth in the network (step 57), and waits for a Loop Back Reply (LBR) received from all of the nodes or a Loop Back (LB) time out. Subsequent to the LBR or the LB time out, the bandwidth reservation process 50 includes verifying responses filed in ORG specific TLVs in Loop Back Replies (LBRs) (step 58).

The bandwidth reservation process 50 includes checking if the reservation was a success (all nodes reply with a success message) or a failure (any node replies with a failure or did not respond) (step 60). If the reservation was a success (step 60), the bandwidth reservation process 50 includes sending an event to the administrator that network bandwidth has been allocated successfully (step 62). If the reservation was a failure (step 60), the bandwidth reservation process 50 includes raising a "resource allocation failure" alarm so that the administrator can respond (step 64), and the bandwidth reservation process 50 includes generating LBM messages to de-allocate network bandwidth on nodes that reported success (step 66).

The bandwidth reservation process 50 takes advantage of IEEE 802.1ag LTM and LTR messages to determine the active route first on which dedicated bandwidth is required. Once the path has been identified, LBM and LBR messages are used with proprietary Organization Specific TLV to reserve the network bandwidth needed by the L2 service. If the network bandwidth allocation fails due to lack of resources available in the network, the failure is returned to the originator, it raises "Resource allocation failed" alarm against service in consideration and previously allocated bandwidth on other nodes is de-allocated. While configuring a downstream E-Line service, the bandwidth allocated at the UNI will also be auto allocated to the NNI network along the downstream unidirectional active path.

Figure 5:
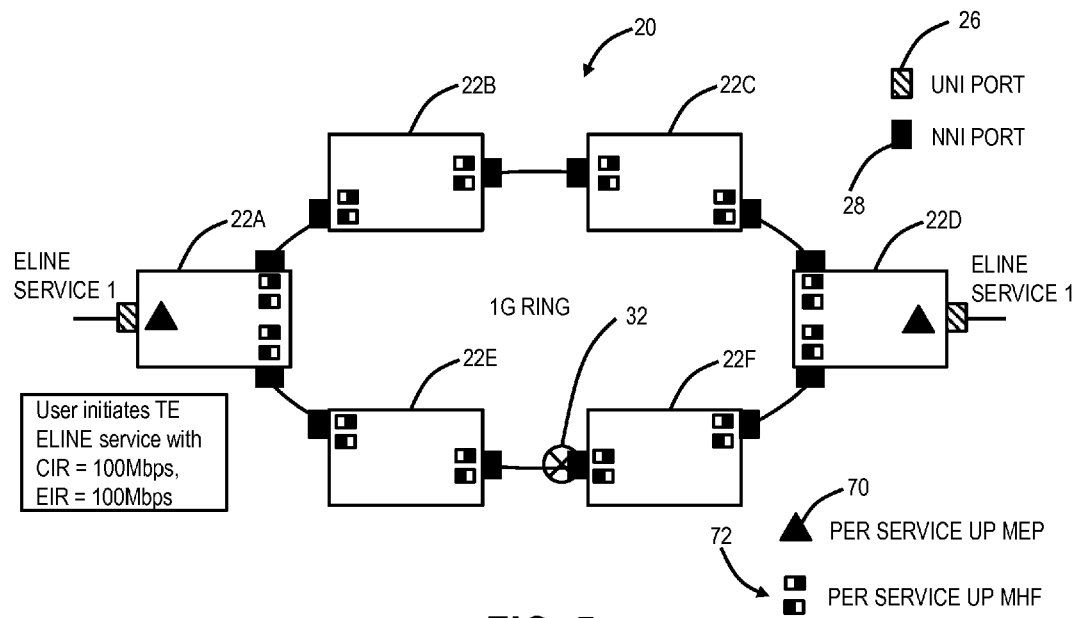
FIG. 5 is a network diagram of the network of FIG. 2 with associated UP Maintenance End Points (MEPs) and UP Maintenance Intermediate Point (MIP) Half Functions (MHFs) for Continuity Check Message (CCM) sessions.

Referring to FIG. 5, in an exemplary embodiment, a network diagram illustrates the network 20 with associated UP MEPs 70 and UP MIPs 72 for Continuity Check Message (CCM) sessions. Prior to implementing the bandwidth reservation process 50, a Continuity Check Message (CCM) session is established. The CCM session is established between the two endpoints of the E-Line service by creating an MA at a desired MD level and adding the UP MEPs 70 at the UNI ports 26. The user has to ensure that MEPs are up and each MEP has discovered remote MEP correctly. At each downstream intermediate node, the MIPs 72 are configured at the NNI ports 28. For an exemplary operation, assuming the network 20 is a 1G ring, and a user initiates a TE EPL service with CIR=100M and EIR=100M.

In the OAM Hierarchy diagram there was a distinction indicated between UP MEPs and DOWN MEPs. This distinction describes the forwarding method used to initiate OAM flows. If an OAM flow is being sent out a specific port (UNI or NNI)—such as with the UNI ME or the E-NNI ME—the MEP is called a DOWN MEP. OAM flows from a DOWN MEP are always initiated through the same port. If an OAM is being sent to a destination in the network—such as with the EVC ME—the MEP is called an UP MEP. The path taken by OAM flows from an UP MEP can change if the network topology changes, e.g., due to the addition, removal, or failure of a path.

Figure 6:
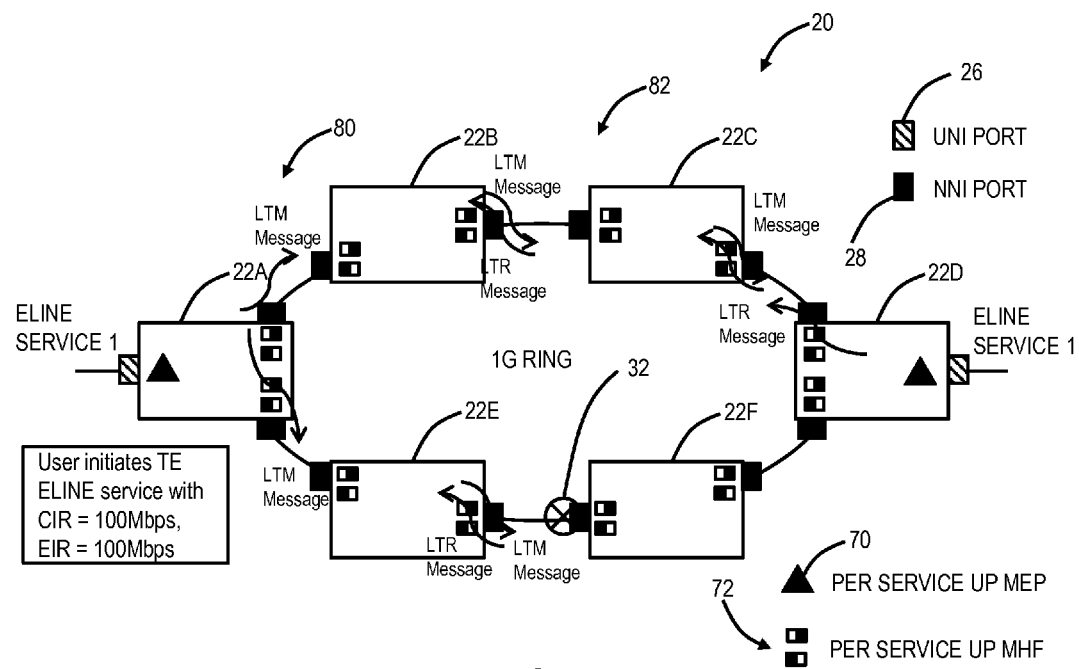
FIG. 6 is a network diagram of the network of FIG. 2 illustrating Link Trace messaging to detect the network path.

Referring to FIG. 6, in an exemplary embodiment, a network diagram illustrates the network 20 illustrating Link Trace messaging to detect the network path. FIG. 6 follows from FIG. 5 wherein the user initiates a TE EPL service with CIR=100M and EIR=100M. When the user/network admin requests to reserve network bandwidth, IEEE 802.1ag LTM messages 80 are automatically generated by the switch 22A to verify the network path towards the destined end of E-Line service, the switch 22D. There are no new TLVs that are added in LTM/LTR messages 80, 82. Upon reception of LTR messages 82 from the intermediate MIPs 72 and target RMEP (the switch 22D), the active network path to the destination is computed. The service UP MEP 70 generates the LTM messages 80 destined to for all service end points. The originating UP MEP 70 receives LTR messages 82 from all service MIPs 72 and MEPs 70 along the active and backup path and calculates the active path along the ring using the existing LTR fields.

At the originating UP MEP 70, some of the LTR messages 82 can be eliminated in one case. First, nodes that are not part of the actual path towards the target RMEP are eliminated from further processing mentioned in below. This is required because resource allocation via the bandwidth reservation process 50 is done in the downstream direction on the active path of the service, not on the backup path. If it is desired to dedicate the resources in the reverse direction of the service path, then network administrator can configure the network bandwidth using this mechanism in reserve direction as well (or the bandwidth reservation process 50 can be implemented in the opposite direction automatically upon provisioning).

Figure 7:
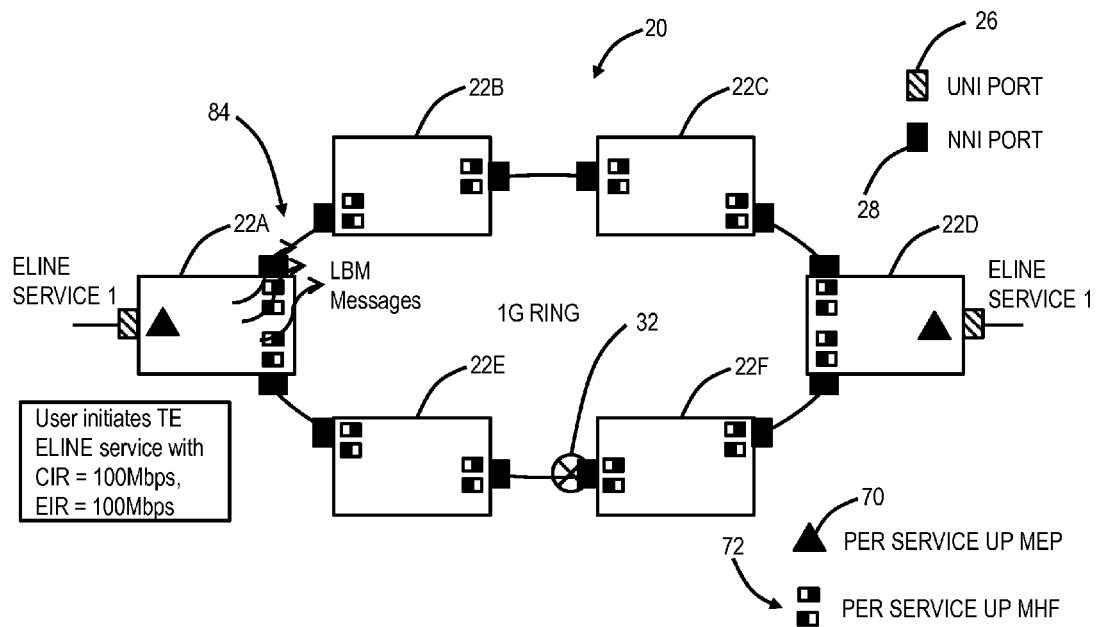
FIG. 7 is a network diagram of the network of FIG. 2 illustrating Loop Back messaging to reserve network bandwidth.

Referring to FIG. 7, in an exemplary embodiment, a network diagram illustrates the network 20 illustrating Loop Back messaging to reserve network bandwidth. Once the path discovery is done using LTM/LTR messages 80, 82 in FIG. 6, and redundant replies are eliminated as explained above, LBM messages 84 are generated that are destined to the MIPs 72 that replied with their LTR messages 82. The LBM messages 84 are generated with message Type field in organization specific TLV set as "ALLOCATE_RESOURCE". That is, the UP MEP 70 at the switch 22A generates ALLOCATE_RESOURCE LBM messages 84 destined to the intermediate service MIPs 72 at the switches 22B, 22C, 22D attached downstream requesting allocation of the configured CIR/EIR/CBS/EBS along the downstream active NNI path (in the ring). The following fields can be added in the Organizational specific TLV in the LBM messages 84: (1) Message Type=ALLOCATE_RESOURCE; and (2) Requested CIR and EIR.

Each of the switches 22B, 22C, 22D receiving the LBM messages 84 verify if there is available bandwidth that has not been allocated on the port receiving the LBM messages 84. The switches 22B, 22C, 22D can reply back with LBR messages 86. If there is available bandwidth, the switch 22 will allocate bandwidth for this service and deduct allocated bandwidth from available bandwidth on the port and send back the LBR message 86 with an ALLOCATE_SUCCESS flag in organization specific TLV in the LBR message 86. If available bandwidth on port is less than requested, the switch 22 does not allocate any bandwidth and returns the LBR message 86 with an ALLOCATE_FAILURE flag and available bandwidth in the organization specific TLV in LBR message 86.

Figure 8:
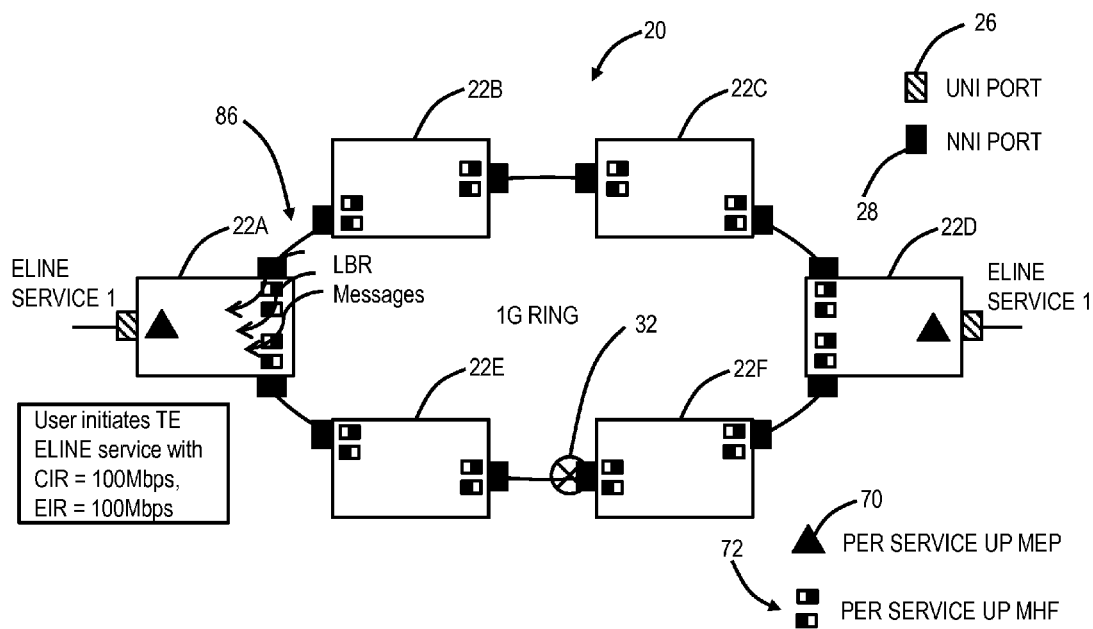
FIG. 8 is a network diagram of the network of FIG. 2 illustrating Loop Back messaging received at the originating node completing the bandwidth reservation process of FIG. 4.

Referring to FIG. 8, in an exemplary embodiment, a network diagram illustrates the network 20 illustrating Loop Back Reply messaging received at the originating node completing the bandwidth reservation process 50. Upon reception of the LBR messages 86 from the MIPs 72 or upon LBR timeout at the originating node, it is determined whether all the switches towards which the LBM messages 84 were generated have replied with their LBR messages 86 having ORG specific TLV with ALLOCATE_SUCCESS flag. If all nodes have replied with ALLOCATE_SUCCESS flag, a "Resource allocation passed" trap could be notified to announce successful completion of TE E-Line service setup. If ALLOCATE_FAILURE response comes from even one of the intermediate switches 22, an alarm "Resource allocation failed" is raised against the E-Line service that informs the network administrator that resource allocation has failed. This alarm also informs the network administrator maximum bandwidth that can be allocated in the network 20.

In the case of the ALLOCATE_FAILURE response, a new LBM request is generated to de-allocate the reserved resources on the switches 22 that replied with their ALLOCATE_SUCCESS message. This message contains the "message type" as DEALLOCATE_RESOURCE. Upon reception of such messages, the intermediate switches 22 de-allocate the network bandwidth that has been allocated by them and reply back with their DEALLOCATE_SUCCESS message. If there is any failure in de-allocation, they shall reply with their DEALLOCATE_FAILURE message. If the originating nodes receives any LBR message with DEALLOCATE_FAILURE flag then it shall retry to DEALLOCATE the resource three more times towards nodes which failed the de-allocation and shall raise resource "Resource De-allocation failed" alarm against service.

The following table illustrates an example of the organization specific TLV used in the LBM message:

| TLV field | Information carried | Size in Bytes |
| --- | --- | --- |
| Type = 31 | Organizational specific TLV | 1 byte |
| Length | Length of TLV value | 2 bytes |
| OUI | Organizationally Unique Identifier obtainable from IEEE | 3 bytes |
| Sub Type | Sub Type shall be implementation specific depending on number of organization specific TLVs encapsulated within LBM frame | 1 byte |
| Message Type | ALLOCATE_RESOURCE: Request to allocate resource DEALLOCATE_RESOURCE: Request to de-allocate resource | 1 byte |
| Resource Information | CIR: Committed information rate: 4 Bytes EIR: Excess Information rate: 4 Bytes CBS: Committed burst size: 2 Bytes EBS: Excess burst size: 2 Bytes move it up for packaging. | 12 bytes |
| Reserved | Reserved for future usage. | 12 bytes |

The Resource Information can also include additional parameters in addition to CIR, CBS, EIR, EBS, such as color-mode, coupling-flag, etc.

The following table illustrates an example of the organization specific TLV used in the LBR message:

| TLV field | Information carried | Size in Bytes |
| --- | --- | --- |
| Type = 31 | Organizational specific TLV | 1 byte |
| Length | Length of TLV value | 2 bytes |
| OUI | Organizationally Unique Identifier obtainable from IEEE | 3 bytes |
| Sub Type | Sub Type shall be implementation specific depending on number of organization specific TLVs encapsulated within LBR frame | 1 Byte |
| Available Resource Information | Maximum bandwidth that can be allocated by node in case of failure scenario. Contains following information:<br>CIR: Committed information rate: 4 Bytes<br>EIR: Excess Information rate: 4 Bytes<br>CBS: Committed burst size: 2 Bytes<br>EBS: Excess burst size: 2 Bytes move it up for packaging. | 12 bytes |
| Flag | ALLOCATE_SUCCESS: Request to allocate resource has succeeded<br>ALLOCATE_FAILURE:<br>Request to allocate resource has failed<br>DEALLOCATE_SUCCESS: Request to de-allocate resource has succeeded<br>DEALLOCATE_FAILURE:<br>Request to de-allocate resource has failed<br>In case of failure, available resource information in this TLV would notify current availability of resources on failed node. This information can be used to determine which resource could not be reserved on failed node. | 1 Byte |
| Reserved | Reserved for future usage. | 12 bytes |

The Available Resource Information can also include additional parameters in addition to CIR, CBS, EIR, EBS, such as color-mode, coupling-flag, etc.

Figure 9:
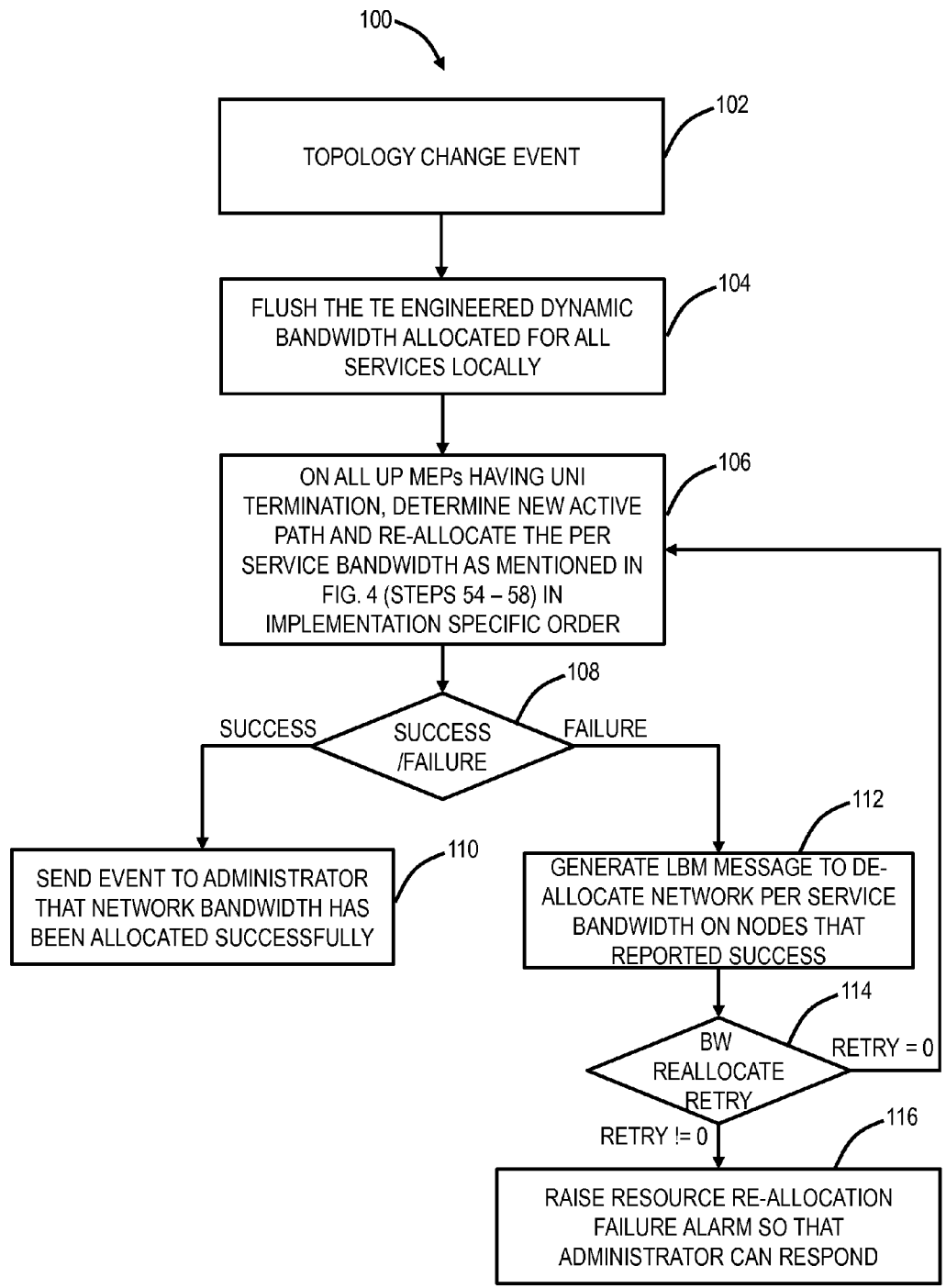
FIG. 9 is a flow chart of a topology change process.

Referring to FIG. 9, in an exemplary embodiment, a flow chart illustrates a topology change process 100. The topology change process 100 can be implemented in the network 20 across the switches 22 as well as with a management system and with the bandwidth reservation process 50. For a topology change event, when topology change events occur, then the switches 22 that receive the topology change event shall immediately free up all bandwidth reserved by the bandwidth reservation process 50. The switches 22 having UNI port terminations shall further allocate the resources on a network path in implementation specific order (e.g. E-Line services priority or order of configuration, etc.) using the bandwidth reservation process 50. In case resource allocation fails during reservation of resources after the topology change has occurred then an alarm shall be raised to notify the network administrator about unserved bandwidth in the network.

The topology change process 100 is implemented responsive to a topology change event in the network (step 102). The topology change event can include addition/removal of a node, addition/removal of a link, a fault affecting a node and/or link, etc. The TE engineered dynamically allocated bandwidth is flushed for all services affected by the topology change event (step 104). Here, the dynamically allocated bandwidth is removed, and it will be recalculated, taking into account the topology change event. On all UP MEPs having a UNI termination, a new active path is determined and the per-service bandwidth is re-allocated such as described in the bandwidth reservation process 50 of FIG. 4, namely steps 54-54, and in an implementation specific order (step 106). If the re-allocation is successful (step 108), an event is sent to the network administrator that the network bandwidth has been allocated successfully (step 110). If there are re-allocation failures (step 108), an LBM message can be generated to de-allocate network per service bandwidth on nodes that reported success for any failed attempts (step 112). A bandwidth re-allocation retry may be performed (step 114), and if unsuccessful, a resource re-allocation failure alarm may be raised so that the administrator can respond (step 116). Also, information can be provided related to the failures, such as reasons and/or available bandwidth.

Figure 10:
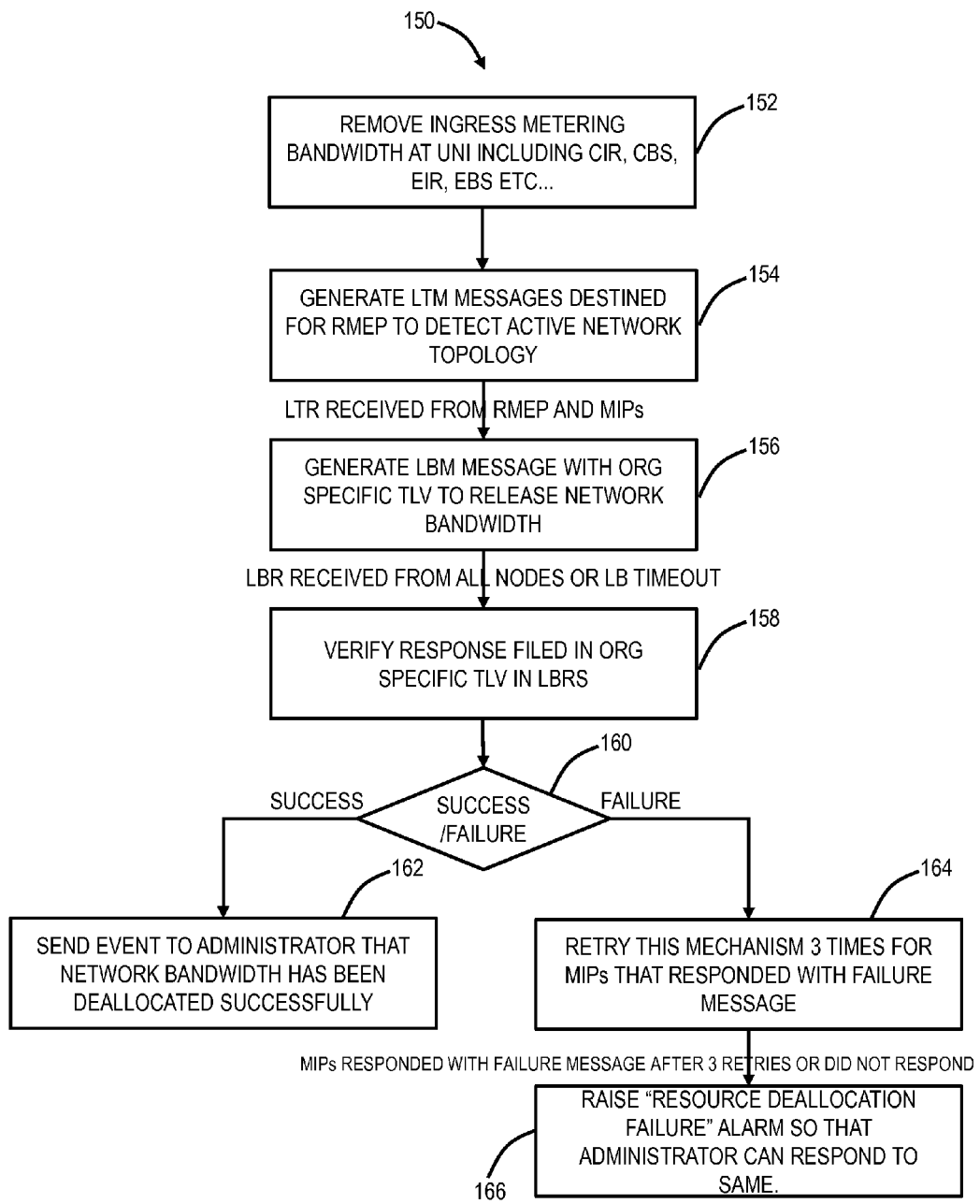
FIG. 10 is a flow chart of a resource de-allocation process.

Referring to FIG. 10, in an exemplary embodiment, a flow chart illustrates a resource de-allocation process 150. The resource de-allocation process 150 can be implemented in the network 20 across the switches 22 as well as with a management system and with the bandwidth reservation process 50 and/or the topology change process 100. The resource de-allocation process 150 is meant to remove allocated or reserved services when there is a failure in the bandwidth reservation process 50 and/or the topology change process 100. First, ingress metering bandwidth at the UNI including CIR, CBS, EIR, EBS, etc. is removed (step 152). LTM messages are generated destined for the RMEP to detect the active network topology (step 154), and LTR messages are received in response from the RMEP and MIPs. LBM messages are generated with organizational-specific TLVs to release the network bandwidth (step 156), and LBR messages are received from all nodes or there is a timeout (step 158). If successful (step 160), an event is sent to the administrator that the network bandwidth has been successfully de-allocated. If there is a failure (step 160), there can be a retry mechanism, such as three times, for MIPs that responded with failure messages (step 164). If after the retry, there are still failures, a resource de-allocation failure alarm can be raised so that the administrator can respond (step 166).

All the LTM/LTR and LBM/LBR messages can use a standard compliant Transaction ID available in LTM/LTR/LBM/LBR messages to collate the replies corresponding to originating request messages.

There is the possibility that network administrator can generate multiple bandwidth allocation requests from different switches 22 at nearly the same time. This will lead to downstream switches 22 handling multiple bandwidth reservation requests at the same time as a result of which scenario can occur where bandwidth allocation request can fail for all requested services, even if there is sufficient capacity on the NNI ports 28 to successfully reserve bandwidth for some of the requests. In order to cater to this race condition scenario, there can be a Bandwidth Allocation Retry mechanism in which the originating node can retry bandwidth allocation after a random timer of 30-60 s.

There can be configurable parameters on downstream switches 22 such as (1) whether the downstream node shall honor the organization specific TLV described herein and (2) the amount of available bandwidth for reservation using the bandwidth reservation process 50.

The bandwidth reservation process 50 reserve the bandwidth on simplex flow (or in one direction only) and needs to be run from both directions for bi-directional reservation of bandwidth. Also, for flow based bandwidth reservations, the bandwidth reservation process 50 can also be extended for reserving bandwidth on per class basis for a given service.

Figure 11:
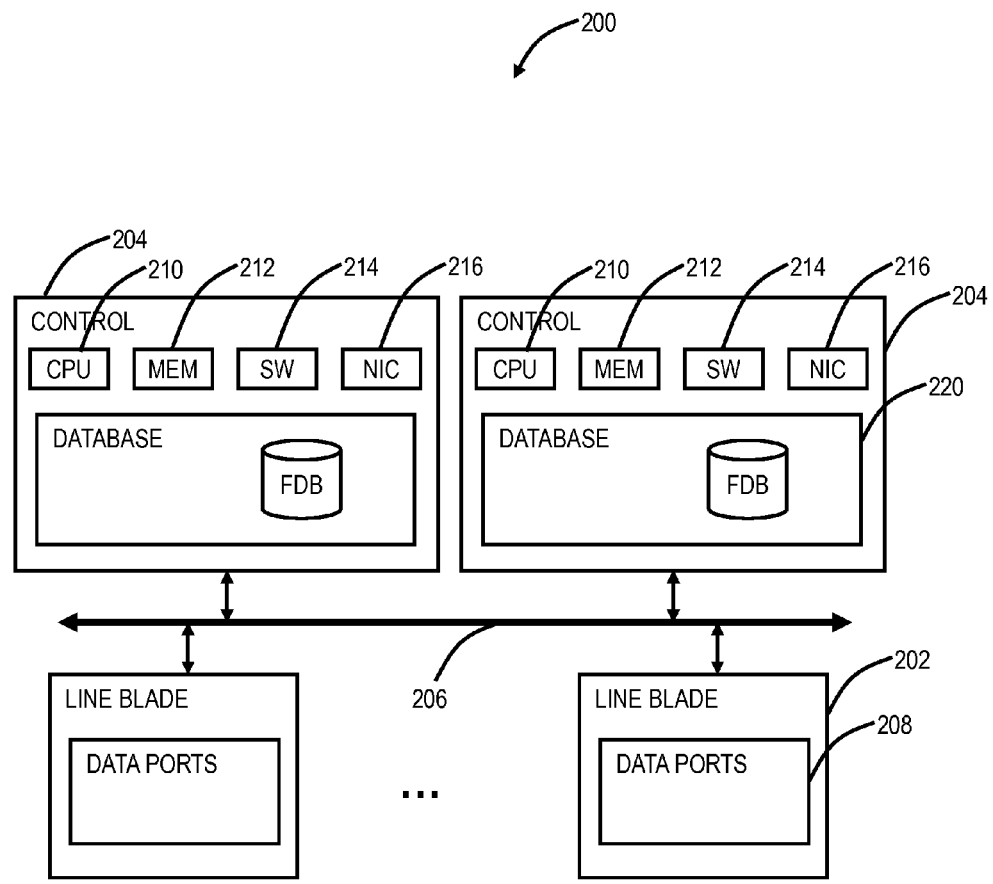
FIG. 11 is a block diagram of an exemplary implementation of a switch.

Referring to FIG. 11, in an exemplary embodiment, a block diagram illustrates an exemplary implementation of a switch 200. In this exemplary embodiment, the switch 200 is an Ethernet network switch, but those of ordinary skill in the art will recognize the systems and methods described herein contemplate other types of network elements and other implementations. The switch 200 can be an exemplary implementation of the MEPs 12, 14, MIP 16, and the switches 22; although other embodiments are also contemplated . . . . In the exemplary embodiment of FIG. 11, the switch 200 includes a plurality of line blades 202 and control cards 204 interconnected via an interface 206. The blades 202 are also known as line cards, line modules, circuit packs, pluggable modules, etc. and refer generally to components mounted within a chassis, shelf, etc. of a data switching device, i.e., the switch 200. Each of the blades 202 and the control cards 104 can include numerous electronic devices and optical devices mounted on a circuit board along with various interconnects including interfaces to the chassis, shelf, etc.

The line blades 202 generally include data ports 208 such as a plurality of Ethernet ports. For example, the line blade 202 can include a plurality of physical ports disposed on an exterior of the blade 202 for receiving ingress/egress connections. Additionally, the line blades 202 can include switching components to form a switching fabric via the backplane 206 between all of the data ports 208 allowing data traffic to be switched between the data ports 208 on the various line blades 202. The switching fabric is a combination of hardware, software, firmware, etc. that moves data coming into the switch 200 out by the correct port 208 to the next switch 200. "Switching fabric" includes switching units, or individual boxes, in a node; integrated circuits contained in the switching units; and programming that allows switching paths to be controlled. Note, the switching fabric can be distributed on the blades 202 and/or the control card 204, in a separate blade (not shown), or a combination thereof. The line blades 202 can include an Ethernet manager (i.e., a CPU) and a network processor (NP)/application specific integrated circuit (ASIC). As described herein, the line blades 202 can participate in the systems and methods described herein.

The control cards 204 include a microprocessor 210, memory 212, software 214, and a network interface 216. Specifically, the microprocessor 210, the memory 212, and the software 214 can collectively control, configure, provision, monitor, etc. the switch 200. The network interface 216 may be utilized to communicate with an element manager, a network management system, etc. Additionally, the control cards 204 can include a database 220 that tracks and maintains provisioning, configuration, operational data and the like. The database 220 can include a forwarding database (FDB). In this exemplary embodiment, the switch 200 includes two control cards 204 which may operate in a redundant or protected configuration such as 1:1, 1+1, etc. In general, the control cards 204 maintain dynamic system information including Layer two forwarding databases, protocol state machines, and the operational status of the ports 208 within the switch 200.

Those of ordinary skill in the art will recognize the switch 200 can include other components which are omitted for illustration purposes, and that the systems and methods described herein are contemplated for use with a plurality of different devices with the switch 200 presented as an exemplary implementations. For example, in another exemplary embodiment, a network element may have switch modules, or have the corresponding functionality in the line blades 202 (or some equivalent) in a distributed fashion. For the switch 200, other architectures providing ingress, egress, and switching there between are also contemplated for the systems and methods described herein. In general, the systems and methods described herein contemplate use with any node providing switching or forwarding of packets using Ethernet OAM as described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
receiving a request for an Ethernet service at a Maintenance End Point (MEP) in a network, wherein the Ethernet service has a destination of a Remote MEP (RMEP), and wherein the request comprises a requested bandwidth amount;
utilizing Link Trace messaging to detect an active path to the RMEP;
utilizing Loop Back messaging to reserve the requested bandwidth amount on the active path;
maintaining a list of a plurality of Ethernet services provisioned using the receiving and utilizing steps;
releasing reserved resources for the plurality of Ethernet services, responsive to a topology change in the network; and
repeating, based on an order, the receiving and utilizing steps for the plurality of Ethernet services.

2. The method of claim 1, wherein the utilizing Link Trace messaging comprises:
transmitting Link Trace Messages (LTM) from the MEP to the RMEP and Maintenance Intermediate Points (MIPs) in-between; and
receiving Link Trace Reply (LTR) messages from the RMEP and the MIPs.

3. The method of claim 1, wherein the utilizing Loop Back messaging comprises:
transmitting Loop Back Message (LBM) messages from the MEP to the RMEP and Maintenance Intermediate Points (MIPs) in-between; and
receiving Loop Back Reply (LBR) messages from the RMEP and the MIPs.

4. The method of claim 3, wherein the LBM messages include an organization-specific Type-Length-Value (TLV) field with the requested bandwidth amount to allocate, and the LBR messages include an organization-specific TLV field with a status of the requested bandwidth amount at the RMEP and the MIPs.

5. The method of claim 1, wherein the requested bandwidth amount comprise any one or more of Committed Information Rate (CIR), Committed Burst Size (CBS), Excess Information Rate (EIR), and Excess Burst Size (EBS).

6. The method of claim 1, wherein the MEP and the RMEP are at User-Network Interface (UNI) ports and the MIPs are at Network-Network Interface (NNI) ports.

7. The method of claim 1, wherein the order is based on an order of provisioning of the plurality of Ethernet services or on a user specified priority.

8. The method of claim 1, further comprising:
receiving Loop Back Reply (LBR) messages from the RMEP and the MIPs indicating one or more failures or a Loop Back timeout;
raising an alarm based on the one or more failures and/or indicating available bandwidth; and
transmitting Loop Back Message (LBM) messages to de-allocate the requested bandwidth amount on any of the RMEP and the MIPs which replied back with success.

9. The method of claim 8, further comprising:
implementing a retry of the receiving and utilizing steps after a random amount of time.

10. A switch, comprising:
a plurality of ports configured to switch Ethernet packets therebetween, wherein the plurality of ports comprise a User-Network Interface (UNI) port and a Network-Network Interface (NNI) port;
a Maintenance End Point (MEP) configured at the UNI port;
a Maintenance Intermediate Point (MIP) configured at the NNI port;
wherein, responsive to a request for an Ethernet service, the MEP performs a bandwidth reservation process which utilizes Link Trace messaging to a Remote MEP (RMEP) to detect an active path to the RMEP and, subsequent to the Link Trace messaging, utilizes Loop Back messaging to the RMEP to reserve bandwidth based on bandwidth amounts in the request on the active path; and
a controller communicatively coupled to the plurality of ports, wherein the controller is configured to:
maintain a list of a plurality of Ethernet services provisioned using the bandwidth reservation process,
cause release of reserved resources for the plurality of Ethernet services responsive to a topology change in the network, and
perform the bandwidth reservation process for the plurality of Ethernet services subsequent to the topology change based on an order.

11. The switch of claim 10, wherein the Link Trace messaging to the RMEP comprises:
transmitting Link Trace Messages (LTM) from the MEP to the RMEP and any MIPs in-between; and
receiving Link Trace Reply (LTR) messages from the RMEP and the MIPs.

12. The switch of claim 10, Loop Back messaging to the RMEP and the MIPs comprises:
transmitting Loop Back Message (LBM) messages from the MEP to the RMEP and Maintenance Intermediate Points (MIPs) in-between; and
receiving Loop Back Reply (LBR) messages from the RMEP and the MIPs.

13. The switch of claim 12, wherein the LBM messages include an organization-specific Type-Length-Value (TLV) field with the bandwidth amounts to allocate, and the LBR messages include an organization-specific TLV field with a status of allocation of the bandwidth amounts at the RMEP and the MIPs.

14. The switch of claim 10, wherein the bandwidth amounts comprise any one or more of Committed Information Rate (CIR), Committed Burst Size (CBS), Excess Information Rate (EIR), and Excess Burst Size (EBS).

15. The switch of claim 10, wherein the order is based an order of provisioning of the plurality of Ethernet services or on user specified priority.

16. A network, comprising:
a plurality of interconnected switches;
a Maintenance End Point (MEP) at a User-Network Interface (UNI) or an External Network-Network Interface (E-NNI) port on a first switch of the plurality of interconnected switches;
a Remote MEP (RMEP) at a UNI port on a second switch of the plurality of interconnected switches;
a plurality of Maintenance Intermediate Points (MIP) at Network-Network Interface (NNI) ports on the plurality of interconnected switches;
wherein a bandwidth reservation process is configured to reserve bandwidth at the UNI port on the MEP responsive to a request and configured to utilize Connectivity Fault Messaging (CFM) to detect an active path to the RMEP and to reserve bandwidth at the RMEP and any associated MIPs; and a controller communicatively coupled to the plurality of interconnected switches, wherein the controller is configured to:

maintain a list of a plurality of Ethernet services provisioned using the bandwidth reservation process, cause release of reserved resources for the plurality of Ethernet services responsive to a topology change in the network, and perform the bandwidth reservation process for the plurality of Ethernet services subsequent to the topology change based on an order.

17. The network of claim 16, wherein the bandwidth reservation process utilizes Link Trace messaging to detect the active path, and the Link Trace messaging comprises:

transmitting Link Trace Messages (LTM) from the MEP to the RMEP and any MIPs in-between; and receiving Link Trace Reply (LTR) messages from the RMEP and the MIPs.

18. The network of claim 16, wherein the bandwidth reservation process utilizes Loop Back messaging to reserve the bandwidth, and the Loop Back messaging comprises:

transmitting Loop Back Message (LBM) messages from the MEP to the RMEP and Maintenance Intermediate Points (MIPs) in-between; and receiving Loop Back Reply (LBR) messages from the RMEP and the MIPs.

* * * * *